United States Patent Office 2,789,533
Patented Apr. 23, 1957

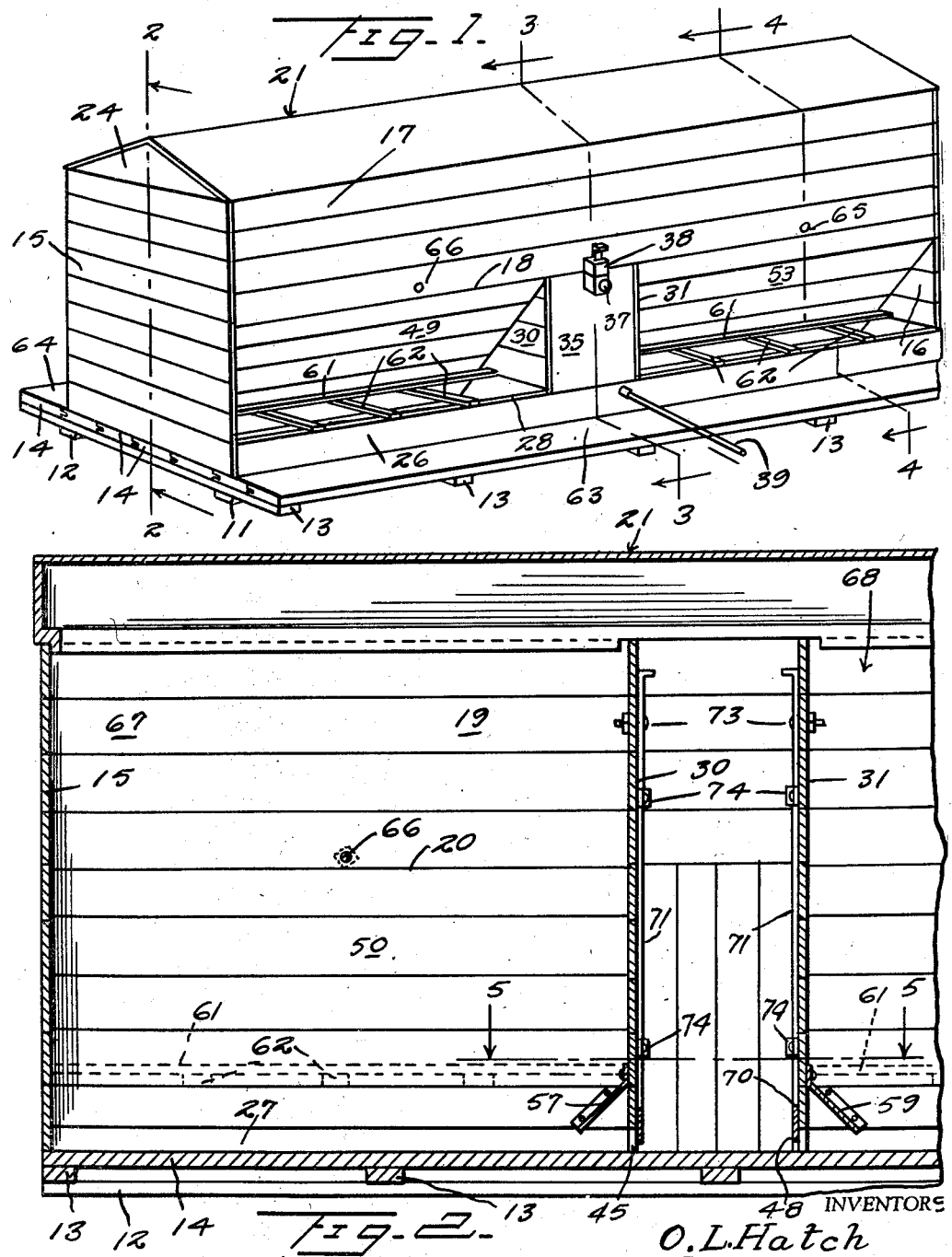

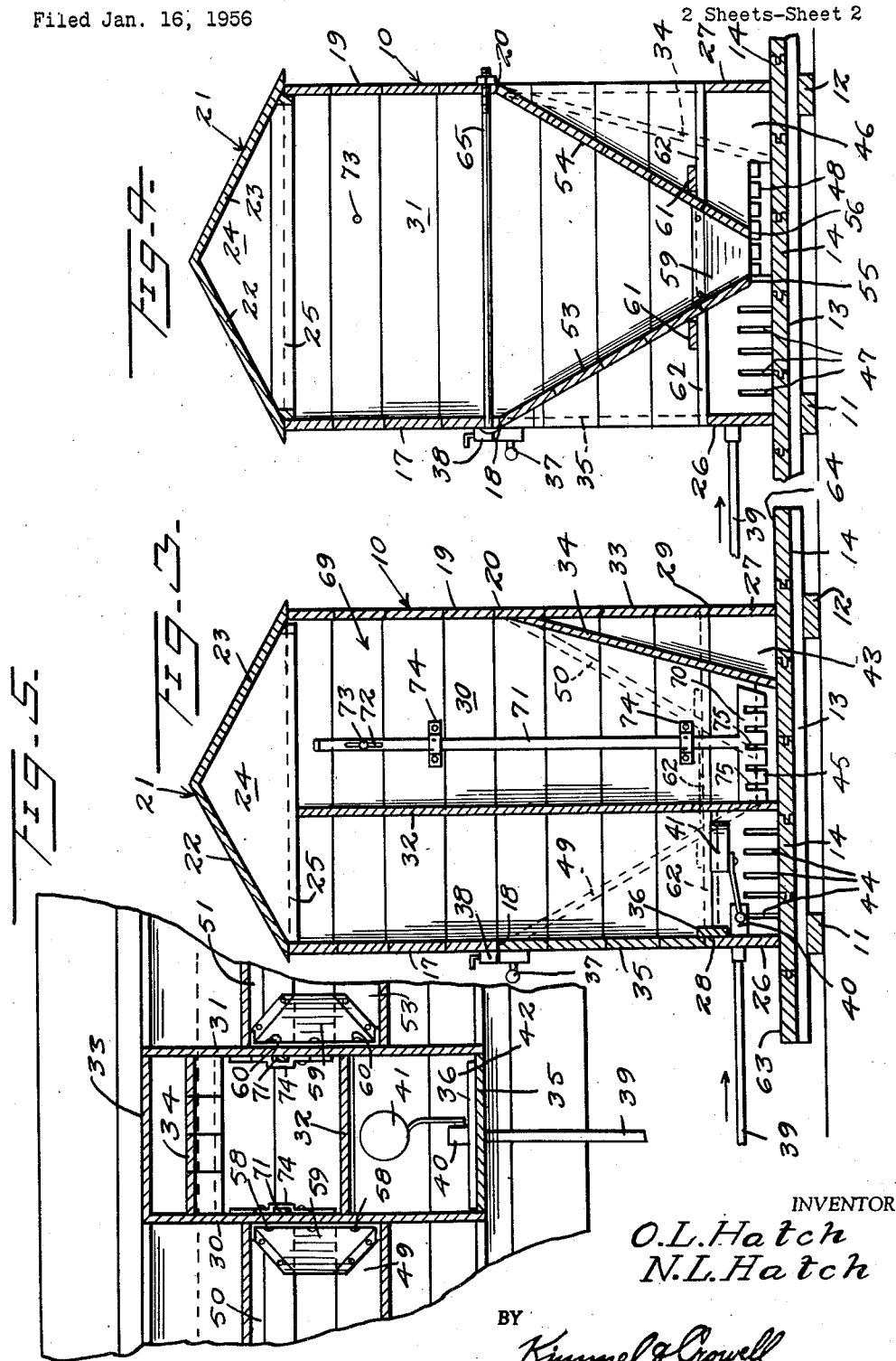

2,789,533
FEEDER FOR LIVESTOCK

Osborn L. Hatch, Mount Sterling, and Norlyn L. Hatch, Timewell, Ill.

Application January 16, 1956, Serial No. 559,198

1 Claim. (Cl. 119—51.5)

The present invention relates to feeders for livestock, and more particularly, to feeders of the type which are adapted to mix feed and feed supplements with water or other fluids to provide a wet food substance.

A primary object of the invention is to provide a stock feeder having a water reservoir positioned adjacent a supplement feed containing hopper whereby the water may dissolve the feed supplement issuing from the hopper.

Another object of the invention is to provide a device as described above in which the water reservoir and feed supplement hopper is positioned adjacent a feed hopper whereby the supplement water and feed can mix.

A further object of the invention is to provide a stock feeder having a floor and trough constructed thereon positioned so as to receive feed for dispensing to livestock.

A still further object of the invention is to provide a structure as described above which will be inexpensive to manufacture, simple to fill and clean, and so constructed as to prevent the livestock from fouling the feed.

Other objects and advantages will become apparent in the following specification when considered in the light of the attached drawings, in which:

Figure 1 is a perspective view of the stock feeder constructed according to the invention.

Figure 2 is an enlarged fragmentary vertical cross-section taken along the line 2—2 of Figure 1, looking in the direction of the arrows.

Figure 3 is an enlarged fragmentary transverse cross-section taken along the line 3—3 of Figure 1, looking in the direction of the arrows.

Figure 4 is an enlarged fragmentary transverse cross-section taken along the line 4—4 of Figure 1, looking in the direction of the arrows.

Figure 5 is a fragmentary horizontal cross-section taken along the line 5—5 of Figure 2, looking in the direction of the arrows.

Referring now to the drawings in detail wherein like reference numerals indicate like parts throughout the several figures, the reference numeral 10 indicates generally a stock feeder constructed according to the invention having a pair of longitudinally extending runners 11 and 12 which are parallel to each other and spaced apart. A plurality of cross-sills 13 extend at right angles to the runners 11 and 12 and are secured thereto by any suitable means (not shown). A plurality of tongue and grooved floor forming boards 14 are secured to the cross-sills 13 and extend at right angles thereto parallel to the runners 11 and 12.

An end wall 15 extends upwardly from the floor 14 at one end thereof and an end wall 16 extends upwardly from the floor 14 at the other end thereof in parallel relation to the wall 15. A side wall 17 is positioned between the end walls 15 and 16 with the bottom edge 18 thereof substantially spaced above the floor 14. A side wall 19 extends between the end walls 15 and 16 oppositely to the side wall 17 and has its bottom edge 20 substantially spaced above the floor 14.

A cover, generally indicated at 21, consists of a pair of sloped roof panels 22 and 23 having gabled ends 24 positioned thereon in alignment with the side walls 15 and 16. A flange 25 is positioned on the cover 21 in position to telescopically engage within the end walls 15 and 16 and side walls 17 and 19 so that the cover 21 will rest on the top of the feeder 10 to provide a removable cover and roof.

A pair of opposed trough forming boards 26 and 27 extend upwardly from the floor 14 between the opposite outer edges of the end walls 15 and 16 with the top edges 28 and 29, respectively, thereof spaced substantially below the respective bottom edges 18 and 20 of the sides 17 and 19. A pair of transverse walls 30 and 31 extend upwardly from the floor 14 between the side walls 17 and 19.

A longitudinal partition 32 extends upwardly from the floor 14 between the transverse walls 30 and 31. A wall 33 extends between the transverse walls 30 and 31 from the top edge 29 of the board 27 to the bottom edge 20 of the side wall 19. A wall 34 extends between the transverse walls 30 and 31 from the side wall 19 sloping downwardly and inwardly to the floor 14 at a point spaced inwardly from the trough forming board 27.

An access door 35 is secured by cleats 36 to the top edge 28 of the board 26 so as to extend between the transverse walls 30 and 31 and terminates at the bottom edge 18 of the wall 17. A handle 37 extends outwardly from the door 35 to provide means for opening the door 35. A spring catch 38 is mounted on the wall 17 to engage the door 35 to secure the door 35 in a normally closed position.

A water supply pipe 39 extends from a constant source of water (not shown) through the board 26 between the transverse walls 30 and 31. A valve 40 closes the inner end of the pipe 39 and is adapted to be controlled by a float 41 positioned within the reservoir 42 formed by the board 26, transverse walls 30 and 31, partition 32, and floor 14.

The bottom board 43 of the side wall 30 is provided with a plurality of slots 44 extending upwardly from the bottom edge of the board 43 in the area thereof lying between the board 26 and the longitudinal wall 32. An elongated notch 45 extends upwardly from the bottom edge of the board 43 in that area of the board 43 lying between the longitudinal wall 32 and the sloped wall 34.

The bottom board 46 of the transverse wall 31 is provided with a plurality of slots 47 extending upwardly from the bottom edge of the board 46 in that area of the board 46 lying between the board 26 and the longitudinal wall 32. A notch 48 extends upwardly from the bottom edge of the board 46 in that area of the board 46 lying between the wall 32 and the sloped wall 34.

A sloped panel 49 extends inwardly and downwardly from the bottom edge 18 of the side wall 17 between the end wall 15 and the transverse wall 30 to a point adjacent the longitudinal center of the feeder 10 spaced above the floor 14. A sloped panel 50 extends inwardly and downwardly from the bottom edge 20 of the side wall 19 to a point adjacent the longitudinal center of the feeder 10 spaced from the floor 14.

The inner lower ends 51 and 52 of the panels 49 and 50, respectively, are spaced above the floor 14 and are spaced apart to permit the flow of feed therebetween. A sloped panel 53 extends inwardly and downwardly from the lower edge 18 of the side wall 17 between the end wall 16 and the transverse wall 31. A sloped panel 54 extends inwardly and downwardly from the lower edge 20 of the side wall 19 between the end wall 16 and the transverse wall 31.

The lower inner edges 55 and 56, respectively, of the panels 53 and 54 are spaced above the floor 14 and are spaced apart to permit the flow of feed therebetween.

A deflector 57 is secured to the wall 30 by means of securing elements 58. The deflector 57 slopes outwardly away from the wall 30 and has its opposite side edges secured to the lower portions of the sloped panels 49 and 50, respectively. A deflector 59 is secured to the transverse wall 31 by means of securing elements 60. The deflector 59 extends outwardly and downwardly at an angle to the transverse wall 31 and has its opposite side edges secured to the lower edges of the sloped panels 53 and 54.

A guard board 61 extends parallel to the floor 14 in spaced apart relation thereto in contacting relation to the outer lower face of the sloped panels 49, 50, 53 and 54. The guard boards 61 extend from the walls 15 and 16, respectively, to the transverse walls 30 and 31. A plurality of divider slats 62 extend from the board 26 through the feeder 10 to the board 27 underlying and supporting the guard boards 61 in spaced apart parallel relation, as best illustrated in Figure 1, to provide a means for preventing the livestock from fouling the trough.

The floor 14 extends laterally beyond the boards 26 and 27 as at 63 and 64 to provide steps to assist the stock in reaching the feed and to prevent rooting by the stock. A pair of tie bolts 65 and 66 extend between the side walls 17 and 19 adjacent the lower edges 18 and 20 thereof to prevent distortion of the side walls 17 and 19 by pressure of food held therebetween.

The construction described above creates a hopper generally indicated by the reference numeral 67; a second hopper generally indicated at 68; and a feed supplement hopper generally indicated at 69 positioned therebetween. A water reservoir 42 likewise being positioned between the hoppers 67 and 68.

A vertically reciprocable valve plate 70 is positioned internally of the hopper 69 adjacent the discharge opening 45 at the bottom edge thereof. A bar 71 supports the plate 70 and extends vertically therefrom. A slot 72 in the upper end of the bar 71 engages over a spring retainer 73 mounted in the wall 30. Cleats 74 extend over the vertical member 71 and are secured to the wall 30 guiding the vertical movement of the bar 71.

The plate 70 carries a plurality of notches 75 to permit the flow of food supplement therebetween. The vertical adjustment of the plate 70 provides an easily adjusted discharge for the food supplement hopper 69. The discharge opening 48 in the wall 31 is provided with an identical valve plate 70 carried by an identical bar 71 which is supported by identical cleats 74 and serves the same function as the plate 70 covering the discharge opening 45.

In the use and operation of the invention, dry feed is placed in the hoppers 67 and 68. Water, controlled by the float 41, fills the reservoir 42 to the top 28 of the board 26, or to any other predetermined point therebelow. A feed supplement such as dehydrated buttermilk or the like, is placed in the hopper 69. Water flowing through the slots 44 and 47 dissolves the food supplement flowing through the notches 45 and 48, and the wet mixture formed thereby flows outwardly to soak the feed flowing downwardly from the hoppers 67 and 68.

As the feed is eaten by hogs and other livestock, additional supplies of feed, feed supplement, and water will automatically flow together to provide a balanced diet until the feed is completely used. The deflectors 57 and 59 overlying the notches 45 and 48 prevent the feed in the hoppers 67 and 68 from choking the notches 45 and 48 which would prevent the flow of food supplement from the hopper 69.

It should be understood that in some installations of the invention herein disclosed, the hopper 69 and water reservoir 42 may have a hopper for feed extending from one side thereof only.

Having thus described the preferred embodiment of the invention, it should be understood that numerous modifications and structural adaptations may be resorted to without departing from the scope of the appended claim.

What is claimed is:

A stock feeder comprising a generally horizontal floor, trough forming side boards extending upwardly from opposite side edges of said floor, a feed supplement hopper spaced above said floor intermediate the opposite ends thereof, a water reservoir on said floor adjacent said feed supplement hopper, means in said water reservoir for maintaining a predetermined water level therein, a pair of dry feed hoppers extending oppositely from said water reservoir and said feed supplement hopper in spaced relation to said floor, said feed supplement hopper having ports therein communicating with the space beneath said pair of feed hoppers between said trough forming side boards, a pair of valve plates movable into position to cover said ports, said valve plates having a plurality of parallel notches extending therethrough, means mounting said valve plates for vertical reciprocation within said feed supplement hopper, said water reservoir having a plurality of ports formed in opposite sides thereof communicating said reservoir with the space beneath each of said feed hoppers between said trough forming side boards, whereby water from said reservoir, feed from said hoppers and controlled quantities of feed supplement from said feed supplement hopper are brought together on said floor between said trough forming side boards.

References Cited in the file of this patent

UNITED STATES PATENTS

| | | |
|---|---|---|
| 325,690 | Nelson et al. | Sept. 8, 1885 |
| 571,280 | Nason | Nov. 10, 1896 |
| 936,129 | Hoffmann | Oct. 5, 1909 |
| 2,111,190 | McGuire | Mar. 15, 1938 |
| 2,530,597 | Chandler | Nov. 21, 1950 |